United States Patent
Pera et al.

[15] 3,669,981
[45] June 13, 1972

[54] S-CHLOROMETHYL COMPOUNDS OF 2-MERCAPTOBENZOTHIAZOLES, 2-MERCAPTOBENZOXAZOLES, AND 2-MERCAPTOBENZIMIDAZOLES

[72] Inventors: John D. Pera; Fred W. Raths, both of Memphis, Tenn.

[73] Assignee: Buckman Laboratories, Inc., Memphis, Tenn.

[22] Filed: Oct. 30, 1969

[21] Appl. No.: 872,732

[52] U.S. Cl. .................260/306, 260/307 D, 260/309.2
[51] Int. Cl. ...............C07d 91/44, C07d 85/48, C07d 49/38
[58] Field of Search...........................260/306, 307 D, 309.2

[56] References Cited

UNITED STATES PATENTS 3,161,495  12/1964  Miller..............................260/309.2
3,215,702  11/1965  Roifschneider...................260/307 D
3,463,785  8/1969  Buckman et al...................260/306.6

OTHER PUBLICATIONS

Kuznetsova et al., Chem. Abstracts, 68:49500f, (1968).

*Primary Examiner*—Alex Mazel
*Assistant Examiner*—R. J. Gallagher
*Attorney*—Floyd Trimble

[57] ABSTRACT

S-chloromethyl compounds of 2-mercaptobenzothiazoles, 2-mercaptobenzoxazoles, and 2- mercaptobenzimidazoles prepared by reacting a metal salt of 2-mercaptobenzothiazole, 2- mercaptobenzoxazole, 2- mercaptobenzimidazoles, or substituted compounds thereof with bromochloromethane in an aqueous system in the presence of a surfactant are useful as intermediates.

10 Claims, No Drawings

S-CHLOROMETHYL COMPOUNDS OF 2-MERCAPTOBENZOTHIAZOLES, 2-MERCAPTOBENZOXAZOLES, AND 2-MERCAPTOBENZIMIDAZOLES

This invention relates to preparation of organic compounds and more particularly to the preparation of organic chloromethyl compounds that are useful as intermediates for the preparation of fungicides.

These organic chloromethyl compounds are more specifically designated S-chloromethyl compounds of 2-mercaptobenzothiazole, 2-mercaptobenzoxazole, and 2-mercaptobenzimidazole having the general formula:

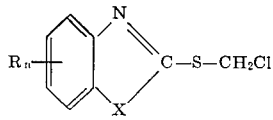

wherein X is oxygen, imino, or sulfur; R is hydrogen, halogen, nitro, alkyl, amino, or hydroxyl; and $n$ is 1 or 2.

Clifford in U.S. Pat. No. 2,092,712 mentions that one of the above identified compounds, specifically 2-(chloromethylthio) benzothiazole, may be prepared by the reaction of a 2-mercaptobenzothiazole salt with an alkylene dihalide but such a process is not preferred because of the instability of the latter compound. In addition, we have found that the yield of the desired product is very low. Clifford purports to prepare 2-(chloromethylthio) benzothiazole by reacting 2-(hydroxymethylthio) benzothiazole with phosphorus trichloride. In the paper by Sexton and Spinks (Journal of the Chemical Society, 1948, 1717), similar reactions are conducted. However, it is obvious that the compound Clifford thought was 2-(hydroxymethylthio)benzothiazole was actually 3-(hydroxymethyl)benzothiazoline-2-thione and that the resulting reaction product with phophorus trichloride was 3-(chloromethyl)benzothiazoline-2-thione.

It is, therefore, a principal object of the present invention to provide an improved process for the preparation of the chloromethyl compounds of this invention which obviates the disadvantages of the prior art processes for the preparation of these compounds.

It is another object of our invention to provide an economical process for the preparation of these compounds.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the chloromethyl compounds of the present invention are prepared by reacting a metal salt, preferably an alkali-metal salt, and more preferably the sodium salt of 2-mercaptobenzothiazole, 2-mercaptobenzoxazole, 2-mercaptobenzimidazole, or substituted compounds thereof wherein one or two of the hydrogens attached to the aromatic ring are replaced by halogen, nitro, alkyl, amino, or hydroxyl radicals with bromochloromethane in an aqueous system and in the presence of a nonionic or an anionic surfactant. Nonionic surfactants are preferred.

In these reactions, bromochloromethane is usually employed in excess. Preferably, we use about five to ten moles of bromochloromethane per mole of the sodium salts of the 2-mercaptobenzothiazole, 2-mercaptobenzoxazole, and 2-mercaptobenzimidazole. During the processing of the reaction products, the excess can easily be recovered by distillation. The reactions are normally run at ambient temperature but, in some cases, the temperature may be increased to 60°to 80° C. to facilitate the reactions. The amount of surfactant employed is usually about one to ten percent based on the weight of the sodium salts of the mercaptans. We prefer to use water only as the reaction medium but, in some cases, water miscible organic solvents such as alcohols and ketones may also be added.

Typical nonionic surfactants include dodecylphenoxypolyethoxy ethanol, ethylene and/or propylene oxide condensates with long-chain alcohols, mercaptans, amines or carboxylic acids. Anionic surfactants include sodium dodecyl sulfate, sodium nonylbenzene sulfonate, sodium dioctyl sulfosuccinate and sodium sulfonates of condensed naphthalene-formaldehyde and lignin sulfonates.

These chloromethyl compounds may be reacted with an alkali-metal or ammonium thiocyanate in the presence of water and/or organic solvents to produce the compounds disclosed in U.S. Pat. No. 3,463,785.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of 2Chloromethylthio)Benzothiazole

A 2-liter, four-necked, round-bottom flask equipped with stirrer, condenser, and thermometer was charged with 378.0 grams (1.0 mole) of a 50 percent solution of sodium 2-mercaptobenzothiazole, 500 grams of water, 20.0 grams of dodecylphenoxypolyoxyethylene ethanol, and 1,294 grams (10.0 moles) of bromo-chloromethane. The reaction mixture was stirred at 25° C. for 6 hours, allowed to separate into two layers and the bottom layer removed. This organic layer was washed with water, separated and the excess bromochloromethane removed under reduced pressure to obtain 237.5 grams of crude 2-(chloromethylthio)benzothiazole. The purity of this crude product as obtained by hydrolyzable chloride analysis was 75.6 percent 2-(chloromethylthio)benzothiazole and the yield was 83.5 percent. Recrystallization of the crude solid from hexane gave 2-(chloromethylthio)benzothiazole, m.p. 41°–42° C.

EXAMPLE 2

Preparation of 2-(Chloromethylthio)Benzothiazole

A 500-milliliter, three-necked, round-bottom flask equipped with stirrer, condenser, and thermometer was charged with 37.8 grams (0.1 mole) of a 50 percent aqueous solution of sodium 2-mercaptobenzothiazole, 258.8 grams (2.0 mole) of bromochloromethane, and 60 milliliters of water. The stirred reaction mixture was heated at reflux temperature of about 65° C. for 15 hours. The organic layer was separated and the excess bromochloromethane was removed under reduced pressure to obtain 21.9 grams of crude 2-(chloromethylthio)benzothiazole in 53.2 percent yield.

Comparison of the reaction conditions and yield in Example 2 with those of Example 1 clearly demonstrates the advantages of the addition of a surfactant as described in this invention.

EXAMPLE 3

Preparation of 2-(Chloromethylthio)Benzoxazole

A 1,000-milliliter, three-necked, round-bottom flask equipped with stirrer, addition funnel, and thermometer was charged with 390 grams (3.0 moles) of bromochloromethane, 250 milliliters of water, and 3.0 grams of dodecylphenoxypolyoxyethylene ethanol. To this stirred mixture a solution of 51.8 grams (0.3 mole) of sodium 2-mercaptobenzoxazole in 250 milliliters of water was added dropwise over a period of one hour. During the addition, the temperature was maintained between 25°and 30° C. The reaction mixture was then stirred at room temperature overnight. The two layers were separated and the aqueous layer was extracted twice with 200-milliliter portions of methylene chloride. The combined bottom organic layer and methylene chloride wash was dried over anhydrous magnesium sulfate, filtered and evaporated under reduced pressure. The residue which was a dark, viscous liquid which solidified on standing weighed 48.1 grams (80.0 percent yield). The product was recrystallized from hexane to obtain pure 2-(chloromethylthio)benzoxazole, m.p. 52°–52° C.

EXAMPLE 4

Preparation of 2-(chloromethylthio)benzimidazole

The 2-(chloromethylthio)benzimidazole was prepared by the method of Example 3 using the sodium salt of 2-mercaptobenzimidazole.

Substituted S-chloromethyl compounds were prepared by following the procedures of Examples 1,3, and 4 by merely substituting alkyl, nitro, amino, halogen, and hydroxyl substituted 2-mercaptobenzothiazole, the corresponding substituted 2-mercaptobezoxazole, and the corresponding substituted 2-mercaptobenzimidazole for the unsubstituted mercapto compounds used in Examples 1,3, and 4.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The process of preparing the compound having the formula:

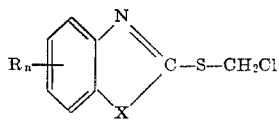

wherein X is oxygen, imino, or sulfur; R is hydrogen, halogen, nitro, amino, or hydroxyl; and n is 1 or 2, which comprises reacting a metal salt of 2-mercaptobenzothiazole, 2-mercaptobenzoxazole, 2-mercaptobenzimidazole, or a substituted compound thereof, wherein one or two of the hydrogens attached to the aromatic ring are replaced by halogen, nitro, amino, or hydroxyl radicals with bromochloromethane in the presence of water as a reaction medium and a nonionic or an anionic surfactant wherein the amount of said surfactant varies from about 1 to about 10 percent based on the weight of said metal salt.

2. The process of claim 1 wherein the surfactant is nonionic.

3. The process of claim 1 wherein the surfactant is anionic.

4. The process of claim 1 wherein the surfactant is dodecylphenoxypolyethoxy ethanol.

5. The process of claim 1 wherein X is sulfur and R is hydrogen.

6. The process of claim 1 wherein X is oxygen and R is hydrogen.

7. The process of claim 1 wherein X is imino and R is hydrogen.

8. The process of claim 1 wherein X is sulfur and R is hydrogen and the surfactant is dodecylphenoxypolyethoxy ethanol.

9. The process of claim 1 wherein x is oxygen and R is hydrogen and the surfactant is dodecylphenoxypolyethoxy ethanol.

10. The process of claim 1 wherein X is imino and R is hydrogen and the surfactant is dodecylphenoxypolyethoxy ethanol.

* * * * *